United States Patent [19]

Johnson

[11] Patent Number: 4,567,957

[45] Date of Patent: Feb. 4, 1986

[54] AIR PALLET WITH ENDLESS BELT INTERFACE

[75] Inventor: Raynor A. Johnson, Newark, Del.

[73] Assignee: American Industrial Research, Inc., Newark, Del.

[21] Appl. No.: 554,657

[22] Filed: Nov. 23, 1983

[51] Int. Cl.[4] .............................................. B62D 55/00
[52] U.S. Cl. ..................................... 180/124; 180/125; 305/34; 414/676
[58] Field of Search ............... 180/116, 117, 119, 124, 180/125; 305/24, 34; 414/676

[56] References Cited

U.S. PATENT DOCUMENTS

| | | | |
|---|---|---|---|
| 3,331,461 | 7/1967 | Eggington | 180/119 X |
| 3,720,277 | 3/1973 | Masaoka | 305/24 X |
| 3,921,752 | 11/1975 | Gregg | 180/125 |
| 3,950,038 | 4/1976 | Wood | 180/125 X |
| 4,298,083 | 11/1981 | Johnson et al. | 180/125 |
| 4,440,253 | 4/1984 | Pernum | 180/125 X |
| 4,455,945 | 6/1984 | Swensson | 180/125 X |

Primary Examiner—Joseph F. Peters, Jr.
Assistant Examiner—Charles R. Watts
Attorney, Agent, or Firm—Sughrue, Mion, Zinn, Macpeak, and Seas

[57] ABSTRACT

An endless belt operatively mounted beneath a load carrying backing member has a lower run moving across a generally planar fixed support surface, in frictional contact therewith. The belt may comprise a woven belt with reinforcing threads. A plenum chamber intermediate of the backing member and the fixed support surface includes a thin-flexible film sheet as the bottom element thereof bearing a plurality of small diameter perforations. The plenum chamber being subject to low pressure air creates a frictionless air film between the film and the belt lower run and jacks the load and backing member. The endless belt may be positively driven by a motor carried by the air pallet structure to form a self-powered vehicle and the endless belt may have cleats on the outside as track members. Cleats on the inside of the belt cooperate with paired, elongated rollers bearing similar sized slots on their periphery for positive drive of the belt.

8 Claims, 6 Drawing Figures

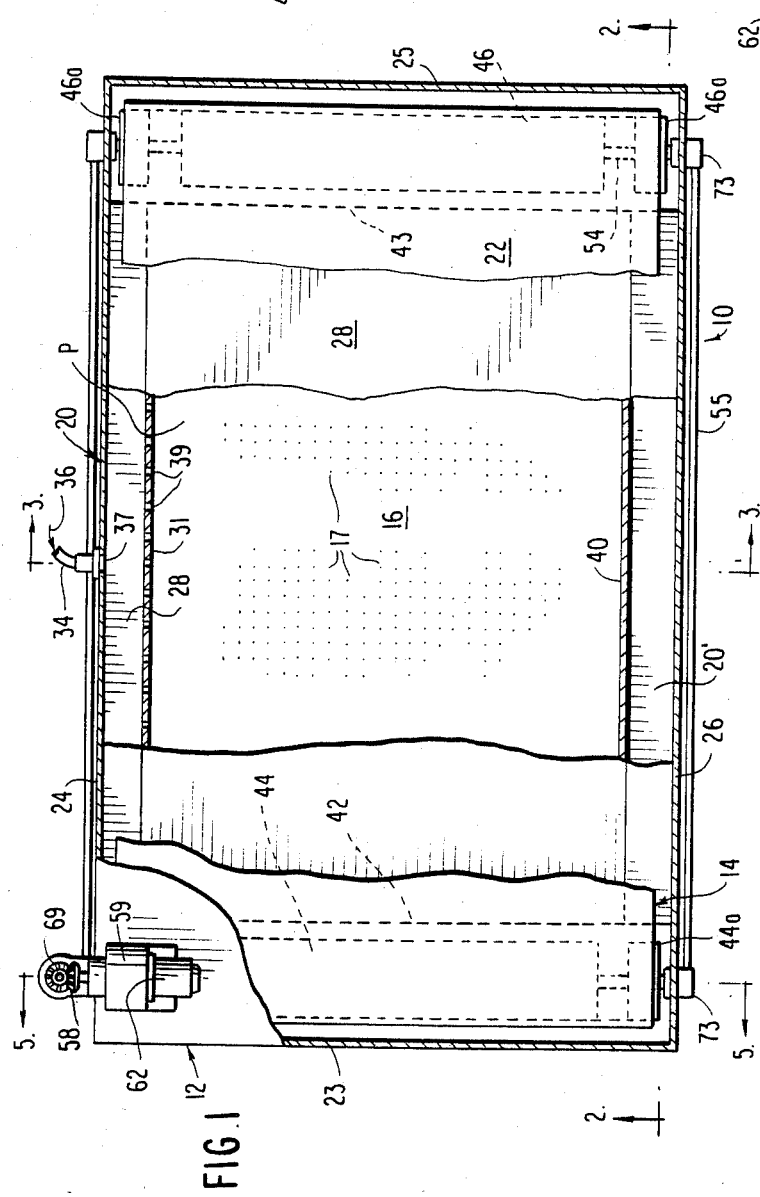

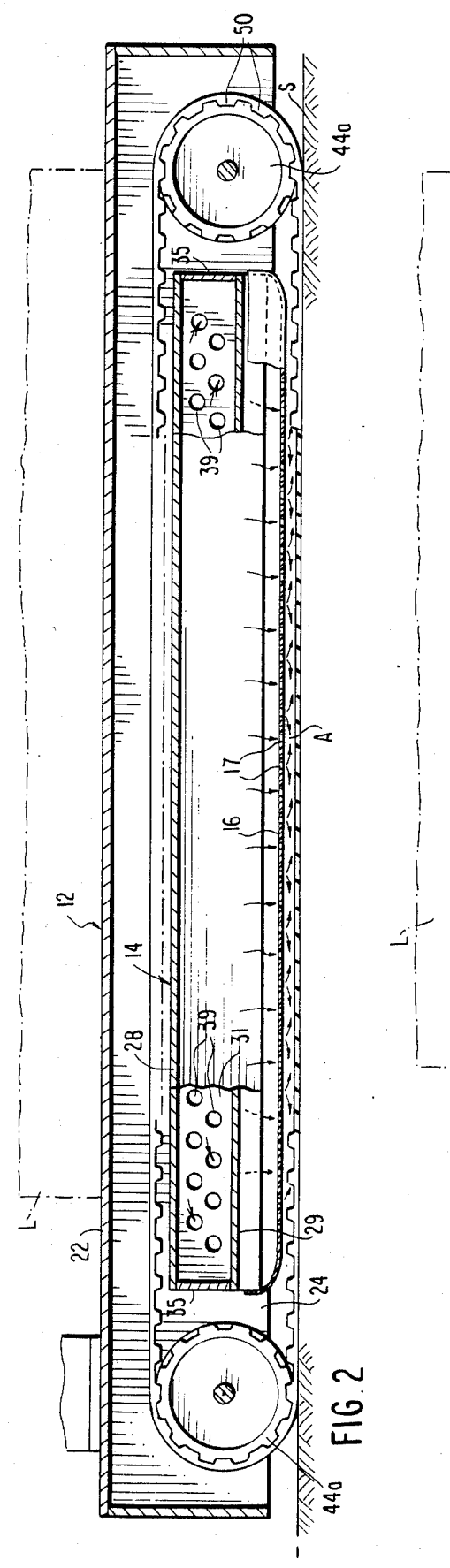

AIR PALLET WITH ENDLESS BELT INTERFACE

FIELD OF THE INVENTION

This invention relates to personnel and material handling; to planar air pallets, permitting heavy loads to be transported within minimal friction restraint; and to such air pallets which incorporate additional means to permit transport of the pallet as a vehicle over rough and irregular surfaces.

BACKGROUND OF THE INVENTION

The present invention is a development from my prior U.S. Pat. Nos. 3,948,344; 4,155,421; and 4,298,083; directed to flexible film air pallets for transporting relatively heavy loads across surfaces with minimal frictional restraint. While the term "air pallet" designates a load support system for the moving of loads on an air film, such term is not limited to replacements for wooden pallets normally moved by fork lift trucks and the like. The air pallets of the patents above are in all respects vehicles, that is, they support a load on an air film, and they permit the load to be moved over an underlying generally planar support surface. Such techniques have been applied to air lifted and propelled vehicles as for instance is the subject matter of copending U.S. patent application Ser. No. 365,520 filed Apr. 5, 1982, now abandoned, of which I am a coapplicant.

The subject matter of the issued patents and copending patent application Ser. No, 365,520 involves a flexible film sheet (or its equivalent) sealably fixed about its edges directly beneath a load or to a load bearing surface and a plenum chamber developed between the sheet and a relatively rigid backing member which could be an element of the load itself. The sheet is perforated within an area lying beneath the load. Low pressure air entering the plenum chamber is distributed by dispersion means which may constitute elements of the backing member, and low pressure air discharges at low flow rates from the plenum chamber through the large number of minute perforations in the flexible sheet to create an air film which raises the pallet or vehicle off the underlying support surface. With the plenum chamber collapsed and the perforated area of the flexible sheet pressed against the underlying support surface, pressurizing the plenum chamber initially jacks the load. The air then tends to escape through the perforations of the flexible sheet and a condition is reached where a number of the perforations open directly to the atmosphere terminating jacking with the creation of a thin frictionless air film beneath the flexible sheet and between that sheet and the underlying generally planar support surface.

The load carrying footprint thereby defined must be sufficiently large to avoid tipping of the load. If the pressurization of the plenum chamber is too high, the flexible sheet balloons, the plenum becomes too large, the flexible sheet becomes too rounded, the footprint becomes too small, and the load becomes unstable and may tip. The portion of the flexible sheet at its edges is not perforated purposely to achieve jacking of the load. The perforations define the "footprint" while the non-perforated portion permits the air pallet to ride over obstructions as it travels across the generally planar support surface.

In pending application Serial No. 365,520, a common air flow source is provided for both raising the vehicle, creating the frictionless air film, and for propelling the vehicle. In that respect, the vehicle comprises an upper deck means defining the top of the plenum chamber in the vehicle with a flexible perforated film sheet or membrane extending beneath the upper deck means. The upper deck means is shaped and configured to define a permanently open plenum and closed by the deck means and the underlying flexible film sheet. In a preferred form, a propellor constitutes the propulsion means which moves the air and creates air for pressurization of the plenum chamber. Part of the air flow is directed through a plenum inlet in the deck and part of the flow is directed off to the side of the vehicle (to the rear) to propel the vehicle which is preferably narrowed along its sides towards the bow in a forward direction across the surface of the land or water upon which it resides.

While such air pallet material and personnel handling and transport devices operate satisfactorily, they have certain drawbacks. In the material handling areas where the air pallet functions to replace conventional wooden pallets, irrespective of the creation of a thin air film between the flexible sheet and the underlying support surface, portions of such flexible sheet material often contact rigid elements particularly where the support surface is roughened or has objects projecting upwardly therefrom. Where holes or slots permeate the support surface, the flexible film tends to project into the slots or holes. In the area of pending application Ser. No. 365,520, where the air pallet constitutes a motorized self-propelled vehicle, such vehicles tend to move rapidly and fairly well over the surface of a body of water. However, where the vehicle is contemplated as being movable, not only on water, but on land, once the vehicle leaves the water, it encounters on the land relatively rough surfaces, and the flexible film has been found to be too fragile for extended use, particularly over rough terrain.

Additionally, irrespective of the nature of the use of the air pallet, when subjected to fairly heavy loads, the extent of jacking provided by the flexible film is limited by the load itself and the ability to move over and about obstructions encountered during travel over the supporting surface becomes limited, while at the same time the air film is destroyed during direct frictional contact occurring between the obstruction and the flexible film sheet, with resulting abrasion and even puncture of the sheet as a result of such encounter.

It is, therefore, a primary object of the present invention to provide an improved air pallet for moving of a load relative to an underlying generally planar fixed support surface wherein a support surface contact member is interposed between the means forming the air film for the air pallet to prevent wear and/or destruction of the air film generating means, to facilitate support of heavy loads by the air pallet, and to permit the air pallet to traverse rough, irregular terrain.

It is a further object of the present invention to provide an improved material and personnel handling air pallet which has application to air cushioned pallets and vehicles which utilize other than a thin perforated flexible film and in which the pallet is automatically frictionally braked upon removal of the air pressure from the plenum chamber without grounding out the perforated flexible film or its equivalent on the underlying support surface and which facilitates the conforming of the bottom of the air pallet to the configuration to obstacles confronted by the moving pallet and to permit it to easily ride over and conform to the shape of such obstacles.

SUMMARY OF THE INVENTION

The present invention is directed to an air pallet for movement of a load relative to an underlying generally planar fixed support surface. The air pallet comprises a generally rigid, generally planar backing member for supporting the load thereon. Means including a plenum chamber carried by the backing member lie intermediate of the backing member and the support surface for both jacking the load and creating a frictionless air film beneath the backing member and the load carried thereby.

The improvement comprises an endless belt operatively mounted to the backing member for movement in endless loop form with a belt lower run interposed between the air film and the support surface, whereby the air pallet is automatically braked by removing air pressure from the plenum chamber, the endless belt flexes to ride over and conform to the shape of the obstacle confronted by the pallet for movement over the support surface and wherein the flexible belt takes the majority of the wear during operation of the air pallet.

The means for jacking the load and creating the air film preferably comprises a rigid, imperforate, open bottom box frame member, a flexible sheet underlying the box frame member and edge sealed thereto to define the plenum chamber with the flexible sheet including a plurality of small diameter perforations within the center thereof to form an air film whose footprint corresponds to the load carried thereby. The backing member comprises means for rotatably mounting the endless belt with the lower run interposed between the flexible sheet and the support surface and the upper run extending across the top of the box frame member. A motor supported by the backing member may be operatively coupled to the endless belt for driving the endless belt to provide a self-driven vehicle. The belt may include cleats on the exterior of the belt for improved frictional engagement with the underlying support surface. Paired rollers mounted for rotation about a horizontal axis on the backing member to opposite ends of the box frame function to mount the endless belt for rotation about the box frame and flexible sheet. The paired rollers may include transverse grooves on the periphery correspondingly sized and positioned to cleats mounted to the inside of the endless belt and being received by the grooves to positively engage the belt with the rollers. The motor may be shaft coupled to one of the rollers for driving the belt.

BRIEF DESCRIPTION OF THE DRAWINGS

FIG. 1 is a top plan view, broken away in part, of an improved air pallet forming one preferred embodiment of the present invention.

FIG. 2 is a longitudinal sectional view of the air pallet of FIG. 1, taken about lines 2—2 of FIG. 1.

FIG. 3 is a transverse sectional view of the air pallet of FIG. 1 taken about lines 3—3.

FIG. 4 is a side elevational view, partially broken away, of the air pallet of FIG. 1.

FIG. 5 is a transverse sectional view of the air pallet of FIG. 1 taken about lines 5—5 thereof.

FIG. 6 is an enlarged sectional view of a portion of the drive mechanism of the air pallet of FIG. 5 taken about lines 6—6.

DESCRIPTION OF THE PREFERRED EMBODIMENT

Referring to FIGS. 1 to 6, a preferred embodiment of the improved air pallet of the present invention takes the form of a material handling or transport device, indicated generally at 10, and consisting of certain principal components. The pallet 10 operates to support a load L which is shown as constituting a rectangular box or container and which may comprise several thousand pounds. The principal components constitute a generally rigid, generally planar backing member or outer box frame member 12 which directly underlies and supports the load L; a generally rigid imperforate, rectangular, inner box frame member 14 which is open at its bottom; a thin flexible perforated sheet 16; and endless belt assembly indicated generally at 18; and at least one manifold indicated generally at 20.

The generally planar, generally rigid backing member 12 includes a relatively large, flat, rectangular plate 22 from which depends, along all four sides, integral vertical walls including lateral sidewalls 24 and 26, FIG. 2, and front and rear walls as at 23 and 25, FIG. 1, respectively. The manifold 20 is mounted to and integrated with one of the walls, as at 24, and constitutes a closed, elongated box formed of top wall 28 of inner box frame member 14, and a bottom wall 29, lateral sidewall 31 of member 19, opposing sidewall 24 of outer box frame member 12, and paired end walls as at 35. A hole 37 is formed within the outer sidewall 24 which sealably receives hose 34. Hose 34 is subjected to a source of air under pressure as indicated schematically by arrow 36 for pressurization of the manifold 20 and thence the plenum chamber P defined by the inner box frame member 14 and the thin flexible sheet 16. A dummy manifold 20' is provided to the left side of the air pallet 10.

To create a thin air bearing as at A between the bottom surface of the thin flexible sheet 16 and the top of lower run 19a of endless belt 19, forming the principal component of belt assembly 18, the thin flexible sheet 16 is sealably connected at its edges to the lower ends of vertical walls of the inner frame member 14. These, are for inner box frame member 14, sidewall 40, front wall 42 and rearwall 43, in addition to sidewall 31. The thin flexible sheet 16 carries a plurality of small (minute) diameter perforations 17 in accordance with the teachings of U.S. Pat. No. 3,948,344. That is, the interior of sheet 16 at some distance from the connection between the ends of the flexible sheet 16 and the vertical walls of the inner frame 14, contain a regular pattern of the small diameter holes or perforations 17 which perform the function of creating an air film or air bearing A. The air bearing literally lifts inner box frame member 14, backing member or outer box frame 12, and load L off of the belt lower run 19a while the lower belt run 19a is maintained in contact with a generally rigid support surface S (floor, ground, water, etc. depending upon the utilization of the air pallet). Again, it should be stated that the term "air pallet" is broadly directed to a load bearing member to facilitate transport of a load. Both land and marine vehicles are included within the term "air pallet".

Thin flexible sheet 16 may comprise a plastic film such as polyethylene, polypropylene or equivalent flexible material. Preferably the material should be flexible but not stretchable. Additionally, the material should impart some resiliency and be capable of withstanding friction, abrasion and the like.

In order to provide low pressure pressurization to the plenum chamber P defined by the inner frame member 14 and the thin flexible sheet 16 sealed thereto about its periphery, the inner box frame member vertical wall 31 is provided with a slot, a hole or a series of slots or holes as at 39.

The principal difference between the air pallet illustrated in FIGS. 1 and 2 of this invention and the prior patents such as U.S. Pat. No. 3,948,344, resides in the utilization of endless belt assembly 18 as a component of the structure, and one which performs multiple functions to improve the life of the air pallet, permitting the carrying of large loads and to facilitate operation of the air pallet or vehicle for land and/or marine use. In that respect, FIGS. 5, 6, the generally planar backing member or open bottom, rectangular box frame member 12, has within its vertical walls 24 and 26 aligned rectangular, elongated slots 70 and 72 at laterally opposite, fore and aft locations, respectively through which extend rectangular slide blocks 73, with shafts 54 rotating therein. Blocks 73 include grooves 73b on each side which slide on outer box frame sidewalls 24, 26, at slots 70, 72. The shafts 54 fixedly support elongated cylindrical rollers 44 and 46, respectively intemediate of the shaft ends. In the illustrated embodiment, to the outside of rollers 44, 46 belt drive discs 44a and 46a are fixed to shaft 54 include longitudinal slots 50 within their peripheries which slots receive appropriately spaced internal cleats 52 mounted to or integral with the inner periphery of belt 19. Cleats 52 are slightly narrower and of slightly less height than the depth of the slots 50 receiving the same and are of a length equal to the width of discs 44a, 46a. The cleats 52, therefore, create a positive drive system for belt 19. Blocks 34 are joined along respective sides of the air pallet by rigid links 55. Shaft 54 for one of the rollers 44 extends somewhat beyond vertical wall 46 of the outer frame member or backing member 12 and a driven spur gear 56 is fixed thereto. A driving spur gear 58 meshes with a driven spur gear 56 which gear 58, in turn, is fixed to shaft 60. The shaft 60 is the driven shaft of a speed reduction mechanism 59 driven by an electrical motor 62, which mechanism 59 is mounted to backing member 12. Motor 62 may be energized by way of leads 64 from a source (not shown). Spline connector 61 includes shaft 63 which rides vertically in bushing 65 caused by arm 73a of block 73. Spur gear 67 fixed to the spur gear 69 on shaft 75 member with spur gear 58 and shaft 75 drives shaft 63 via spline cylinder 61 and spline 63a on shaft 63. Beveled gear 67 on the lower end of shaft 63 rides on beveled spur gear 56. As such, the air pallet 10 is driven across the support surface S as a result of driving the endless belt 19 whose lower run 19a contacts the underlying support surface S irrespective of whether the plenum chamber P is pressurized or not and the presence or absence of air bearing A.

As may be appreciated, in addition to the internal cleats 52, there may be provided external cleats on belt 19 which would cause the belt to constitute a track member insofar as moving the air pallet 10 across the underlying generally planar support surface S. Such use of external cleats is particularly advantageous if the air pallet is functioning as a land transport vehicle.

Under operation, by application of air under pressure as at 36, through manifold 20 to the plenum chamber P, air tending to escape, initially causes the flexible sheet to flex into the position shown in FIG. 2, jacking the load L, the outer frame member 12, the inner frame member 14, and the flexible sheet off of the belt lower run 19a which continues in contact with the underlying support surface S. Air bearing A is created as a thin film between the flexible sheet 16 and the top surface of the belt lower run 19a by escape through perforations 17. As such, there is only a small amount of friction seen by the air pallet as an additional load in moving load L across the support surface to left and right or vice versa, FIG. 2, depending upon the propulsion provided as deemed by the direction of rotation of the belt, as a result of energization of motor 62. In the absence of motor 62, an external force can be provided to the load and/or the air pallet 10 to move the air pallet with the air film or air bearing A being maintained between the thin flexible sheet 16 and the belt lower run 19a.

By increasing the air flow at 36, and the resultant pressurization of plenum chamber P, further jacking is effected and ballooning of the flexible sheet 16 to the point where the load can be pivoted about a center point with maximum ease. This provides great maneuverability to the air pallet. Additionally, as may be appreciated, when the air pallet is travelling up or down an incline, since the belt 19 provides a large surface area directly in contact with the underlying support surface S which could be the earth or ground, the termination of air under pressure, as indicated by arrow 36, results in an immediate termination of air pressure within the plenum chamber P, elimination of the air bearing A. This causes the load to rest on the belt pressing the belt against the underlying support surface S to automatically brake the air pallet and prevent its movement in either direction irrespective of the inclination of that support surface. Of course, since the endless belt is mounted on rollers, if the load were sufficiently great, or the angle of inclination sufficiently large, the pallet would tend to drift downhill with the endless belt being driven under a freewheeling action. It also should be appreciated that a further braking action could be effected by electrically or mechanically preventing rotation of motor shaft 60 since in the illustrated embodiment, there is a gear transmission connection between driving roller 44 and drive motor 62.

As may be additionally appreciated, if the surface S has an obstacle projecting upwardly therefrom over which the endless belt 19, contacting the flexible sheet 16 traverses, both the belt 19 and the flexible sheet 16 will flex with the pillowing of the flexible sheet 16 permitting the pallet to ride over the obstacle and permitting the belt and flexible sheet to conform to the shape of the obstacle confronted during air pallet movement across surface S.

Preferably, the flexible belt 19 is one which will withstand abrasion and wear. It may comprise a woven belt including nylon threads to improve the wearability and life of the endless belt, which belt is in continuous contact with the surface S across which the pallet traverses. As may be appreciated, the roller diameter governs the size of obstacles over which the endless belt 19 will traverse during operation of the air pallet in material handling or personnel transport. Air source 36 may constitute a backpack type unit as at 112, FIG. 8, of U.S. Pat. No. 3,948,344. The motor 62 may be driven by alternating current through a conventional electrical outlet via an extension cord or the like, alternatively, it may be a d.c. motor powered by a dry cell or wet cell battery through appropriate switch means (not shown).

Over the course of years, a number of air cushion devices or air pallets have been developed which utilize a so-called doughnut within which air at some pressure is circulated and wherein the doughnut is equipped with a central, relatively large diameter opening or hole permitting the air to escape and to, in turn, create a plenum chamber between the doughnut and the underlying support surface. Air escaping from the bottom of the doughnut about all sides thereof defines an air bearing between the doughnut and the underlying support surface. Because air flow is essentially unrestricted, a large CFM of air flow is required which in turn requires considerable energy to insure the creation of an air film sufficient to permit frictionless movement of the air pallet. Such devices are characterized by U.S. Pat. No. 3,321,038 to Mackey et al. and U.S. Pat. No. 3,261,177 to Amann et al.

While such air pallets or air cushion devices can be readily distinguished from the low CFM, low pressure air pallets such as U.S. Pat. No, 3,948,344, the utilization of an endless belt interposed between the means for creating the air film and the load and providing a contact surface for the air pallet or vehicle with respect to the underlying support surface, envisions the substitution of such air cushion devices as found in patents 3,321,038 and 3,261,177 for the flexible perforated flexible film type of air film generating means, without departing from the scope of the present invention.

The inner box frame member and the thin flexible sheet of the illustrated embodiment of FIGS. 1 and 2 could have substituted therefor platform 2 and a preformed flexible diaphragm element 12 of U.S. Pat. No. 3,321,038 to Mackey et al. to form a doughnut shaped chamber receiving air through an equivalent to manifold 20 and in which case essentially the device of U.S. Pat. No. 3,321,038 would be incorporated within the endless belt 19 with operation of the air pallet under this modified form being essentially the same as previously described with the embodiment illustrated.

While the invention has been particularly shown and described with reference to a preferred embodiment thereof, it will be understood by those skilled in the art that various changes in form and details may be made therein without departing from the spirit and scope of the invention.

What is claimed is:

1. In an air pallet for movement of a load relative to an underlying generally planar fixed support surface, said air pallet comprising a generally rigid, generally planar backing member for supporting said load thereon and underlying said load, means including a plenum chamber intermediate of said backing member and said support surface for jacking said load and creating a frictionless air film beneath said backing member and said load, the improvement comprising:

an endless belt operatively mounted to said backing member for movement in loop form and having a lower run interposed between said air film and said support surface, whereby said belt lower run contacts said underlying support surface during movement of said air pallet across the same to take up the wear and said belt flexes to ride over and conform to the shape of the obstacle confronted by said air pallet during movement across said support surface, said means for jacking said load and creating said air film comprising a rigid, imperforate, downwardly open, inner box frame member fixedly mounted to said backing member and spaced therefrom, a thin flexible sheet underlying said box frame member being edge sealed to said box frame member to define a plenum chamber therebetween, said thin flexible sheet including a plurality of closely spaced small diameter perforations within the center of said sheet corresponding to a footprint of the load for creation of an air film between a perforated portion of the thin flexible sheet and the lower run of said endless belt with a nonperforated portion between the sealed edge and the perforations to facilitate jacking of the load, pillowing of the thin flexible sheet and for facilitating ballooning of the thin flexible sheet, and said backing member further comprising means for rotatably mounting said endless belt with said endless belt including an upper run passing over the top of the box frame member;

whereby, the plenum chamber is fully sealed except for the escape of low pressure air through the plurality of closely spaced, small diameter perforations within the center of the sheet corresponding to the footprint of the load to maximize flexure of the thin flexible sheet and the underlying lower run of the endless belt as the air pallet moves over and conforms to the shape of the obstacle confronted by the air pallet during movement across the support surface, and wherein by increasing the air pressure within the plenum chamber, the nonperforated portion of the thin flexible sheet between the sealed edge and the perforations permits the thin flexible sheet to balloon with further jacking of the load to a point where the load can be pivoted about a center point of the thin flexible sheet and the underlying lower run of the endless belt with ease, providing high maneuverability to the air pallet.

2. The air pallet as claimed in claim 1, wherein said means for rotatably mounting said endless belt comprises roller members mounted for rotation about an axis parallel to the plane of said backing member, at front and rear ends of said backing member, wherein said endless belt is trained over said rollers, and wherein said rollers have axles extending axially from opposed ends thereof, said axles projecting through rectangular, vertical elongated slots within vertical walls depending downwardly from the backing member, and blocks slidably mounted within said vertical slots and movable vertically therein, said blocks including horizontal bores sized to and receiving said axles with said axles rotatable therein, such that said rollers may move vertically relative to said backing member to ride over obstacles confronted by the air pallet during movement across the support surface.

3. The air pallet as claimed in claim 2, further comprising motor drive means carried by said backing member and operatively engaging at least one of said rollers for positively driving said rollers to cause said endless belt to rotate and to move said pallet over said underlying support surface.

4. The air pallet as claimed in claim 3, further comprising spaced inner cleats mounted transversely to the inner surface of said endless belt, and longitudinal grooves within the periphery of said rollers at positions on said rollers corresponding to said cleats and being sized thereto for receiving said inner cleats, such that said belt comprises a positively driven track member.

5. The air pallet as claimed in claim 4, wherein said belt comprises a woven belt including nylon reinforcing threads to provide long wearability to the belt in engagement with the underlying support surface.

6. The air pallet as claimed in claim 1, wherein said backing member comprises an outer box fame member including a generally rectangular flat plate, walls extending downwardly from said plate about the edges thereof, said inner box frame member being fixedly mounted to said box outer frame member and including a imperforate rectangular flat wall spaced vertically from said plate of said outer box frame member, and wherein said endless belt further comprises an upper run passing between the flat plate of the outer frame and the imperforate sheet of said inner frame.

7. The air pallet as claimed in claim 6, further comprising paired rollers mounted to said outer box frame member at opposite ends thereof, exterior of said inner frame member, and wherein said endless belt is trained about said rollers for movement thereon.

8. The air pallet as claimed in claim 7, wherein said rollers include longitudinal grooves within the peripheries thereof, and said endless belt includes transverse cleats of a width and height slightly less than the width of and the depth of said grooves within said rollers and spaced apart at distances corresponding to said grooves so as to be received in said grooves such that said endless belt and said rollers comprise a positive drive system for positively driving the belt at a relative speed corresponding to the speed of rotation of said rollers.

* * * * *